Aug. 6, 1957 J. K. RUSSELL ET AL 2,801,764
SEALING STRUCTURE
Filed Dec. 3, 1954

INVENTOR.
JOHN K. RUSSELL
WALTER W. BOGGS
BY THEIR ATTORNEYS.
HARRIS, KIECH, FOSTER & HARRIS

United States Patent Office 2,801,764
Patented Aug. 6, 1957

2,801,764

SEALING STRUCTURE

John K. Russell and Walter W. Boggs, Los Angeles, Calif., assignors to Luber-Finer Incorporated, Los Angeles, Calif., a corporation of California Application December 3, 1954, Serial No. 472,942

1 Claim. (Cl. 220—46)

The present invention relates to a new and improved sealing structure which is primarily designed to be used in sealing a cover upon an oil filter housing, but which obviously may be used in other related situations. This application is a continuation-in-part of our copending application Serial No. 382,068, filed September 24, 1953, now Patent No. 2,709,524.

In sealing in a cover upon a pressure vessel, such as, for example, an oil filter housing, it is necessary to provide some sort of sealing structure which is exceedingly efficient for the purpose intended. Further, such a sealing structure must be comparatively simple in construction so that it may be easily and cheaply manufactured. It also must be comparatively rugged so that it will not be bent into an unusable shape during the rough handling normally encountered. A broad object of the present invention is to provide a sealing structure having these characteristics.

A more detailed object of the invention is to provide sealing means formed upon adjacent parts of a pressure vessel, such as, for example, an oil filter housing and a cover therefor, which sealing means are also easily and cheaply manufactured, compartively rugged, and yet are exceedingly efficient for the purpose intended. Another more limited object of the invention is to provide a clenching band composed of sections in the general shape of segments of a circle, which sealing band is adapted to pull sealing means such as are indicated in the preceding sentence towards one another so as to form an effective seal.

The invention may be briefly summarized as including sealing means comprising projecting flange-like members upon adjacent parts of a vessel, such as, for example, a complete casing for an oil filter consisting of a housing and a cover, and a sealing ring disposed between these flanges. The invention may be further briefly summarized as including a clenching band composed of a plurality of sections, each of these sections being in the general shape of a segment of a single circle and each having sloping sides; means for joining these sections so that they may be moved with respect to one another; and means for holding these sections in the general shape of such a circle, and for tightening these sections. Further details of the invention are best more fully described with reference to the accompanying drawing in which:

Fig. 1 is a top view showing a sealing band of the present invention in an operative position;

Fig. 2 is a cross-sectional view taken at line 2—2 of Fig. 1;

Figs. 3 and 4 are side views taken in the direction of the arrows 3 and 4 in Fig. 1; and Fig. 5 is a cross-sectional view which is similar to Fig. 2 of a modified construction of the invention.

In Fig. 1 of the drawing there is shown a complete sealing structure 10 which is used as indicated in Fig. 2 for holding a circular cover 12 upon a cylindrical housing 14. The cover 12 and the housing 14 are intended to represent, as illustrated, a conventional cover and housing employed with an oil filter, although, obviously, these two members may be also taken as representing equivalent parts of any pressure vessel. Sealing means 16 are formed on these two members and held between them for the obvious purpose of forming a complete seal between the cover 12 and the housing 14.

The sealing means 16 preferably used includes circular flanges 18 formed on both of these members in parallel planes. Both of these flanges 18 are formed so as to include an internal curved edge 20 and an outer circular portion 22. These circular portions 22 of the flanges 18 are designed so as to face one another defining a generally circular internal cavity 24 having an edge opening 26 defined by the curved edges 20. The flanges 18 are also provided with peripheries 28 which are adapted to seat against one another.

During normal operation of the sealing means 16, a resilient sealing ring 30 forming a part of these sealing means is disposed within the internal cavity 24, and, as the flanges 18 are held together by a clenching band 32, this sealing ring 30 projects through the edge opening 26 towards the interior of a complete vessel 34 defined by the cover 12 and the housing 14. The portion of the sealing ring 30 within this vessel 34 provides a very efficient internal seal against pressure when the complete sealing structure 10 is assembled as shown, and, as pressure is applied to the inside of this vessel 34, the ring 30 tends to deform against the adjacent curved edges 20, forming what can be termed a "calked" type of seal.

The clenching band 32 is composed of a plurality of sections 36, each of which is formed in the shape of a segment of a single circle, the center of which corresponds to the center of the housing 14. It will be realized that the flanges 18 are also symmetrically disposed about this same center. Each of the sections 36 is provided with an exterior wall 38 which is preferably, but not necessarily, generally parallel to an exterior wall of the housing 14, and with side walls 40, which, as shown in Fig. 2, are disposed at the same acute angle with respect to a plane perpendicular to the axis of the housing 14 so that the apex of such an angle is positioned away from the vessel 34. These side walls 40 are designed to engage the partial circular portions 22 when the complete sealing structure 10 is employed, holding these partial circular portions 22 so that the peripheries 28 of the flanges 18 are in contact with one another.

Adjacent sections 36 of the clenching band 32 are joined together by means 42 in such a manner that the sections 36 may be moved with respect to one another within a single plane. The means 42 employed may be termed "link" means, if desired, inasmuch as they are constituted by curved links 44 which are secured to the sections 36 by means of pivot pins 46 held within bearing members 48 rigidly attached to the sections 36. This structure is quite clearly shown in both Figs. 1 and 3 of the drawing.

Two of the adjacent sections 36 forming a part of the clenching band 32 are attached to one another by means 50 which serve to hold all of the sections 36 in the general shape of a circle, and which serve to enable these sections to be tightened with respect to one another so as to gradually wedge the flanges 18 into a sealing position such as is indicated in Fig. 2. This feature of the invention will be more fully explained in detail later.

The means 50 include upstanding pairs of projections 52 formed upon the adjacent edges 54 of two of these sections 36, as indicated in Fig. 1 of the drawing. Between the projections 52 upon one of these sections 36 there is held a bearing member 56 by means of a pivot pin 58 in such a manner that this bearing member may be rotated as desired with respect to the projections 52. The bearing member includes a cylindrical opening 60, the axis of which is located substantially at right angles to the pivot pin 58. This central cylindrical opening 60 is also located so as to be disposed within a plane perpendicular to the axis of the housing 14. It is adapted to carry a common bolt 62 in such a manner that as the head 64 of this bolt is turned the bolt may be drawn within a threaded opening 66 formed within a connecting member 68 secured by means of a pivot pin 70 between the two projections 52 formed on an adjacent section 36. It is considered obvious from Fig. 4 of the drawing that the connecting member 68 may be rotated by virtue of this construction so that the axis of the threaded opening 66 at all times coincides with the axis of the cylindrical opening 60.

The use of the complete sealing structure 10 is very simple. When the various members are disposed in the positions illustrated in the drawing, the sealing structure 10 is, of course, operative. When it is desired to open the vessel 34, the bolt 62 may be unscrewed so as to be placed out of attachment with the connecting member 68. At this time, all of the sections 36 forming the clenching band 32 may be moved out of engagement with the flanges 18 forming a part of the sealing means 16, and the cover 12, and, if desired, the sealing ring 30 may then be lifted from the housing 14.

In resealing the vessel 34, the ring 30 is placed in the general location illustrated, the cover 12 is placed upon this ring so that the flanges 18 are opposite one another as shown. Then, the clenching band 32 is passed around the flanges 18 so that the side walls 40 of the sections 36 engage these flanges 18. Next, the bolt 62 is passed through the opening 60 and within the threaded opening 66. The bolt 62 is then turned so as to pull the bearing member 56 towards the connecting member 68. As this is done, the side walls 40 of the sections 36 slide upon the cylindrical portions 22 of the flanges 18 forcing these flanges towards one another, compressing the sealing ring 30 to the operative configuration shown in Fig. 2. During this process, it will be realized the effective diameter of the clenching band 32 is decreased, and the bearing member 56 and the connecting member 68 will both rotate slightly so as to remain in alignment with one another. Preferably, the amount which the clenching band 32 may be tightened is limited by means of ends 72 and 74 formed on the bearing member 56 and the connecting member 68. In serving this function, the ends 72 and 74 merely abut against one another. They are preferably located so that the clenching band 32 may be tightened only so far as is necessary to place the individual sections 36 with respect to one another so as to form a complete circle, the axis of which, of course, coincides with the axis of the housing 14. When these sections 36 are located in this position, the peripheries 28 of the flanges 18 are either in contact with one another or closely spaced from one another.

In Fig. 5 of the drawing a modified construction is shown utilizing the same clenching band 32 previously described, and a new sealing means 80. This sealing means includes flanges 82 formed on both the cover 12 and the cylindrical housing 14. Each of these flanges includes a sloping side wall 84 which is straight, and a curved peripheral end 86, which ends are adapted to seat against one another when the sealing means 80 is employed for the purpose intended. The slope of both of the side walls 84 is identical with the slope of the side walls 40 of each of the sections 36 of the clenching band 32 so that when the sealing means 80 is employed the side walls 40 of these sections 36 lie flat against the side walls 84 of the flanges 82. It is readily seen from an examination of Fig. 5 how the side walls of the sections 36 will fit against these side walls 84 in substantially the same manner as illustrated in Fig. 2 when the clenching band 32 is being employed to draw the flanges 82 towards one another. The ends 86 may seat against one another, or may be closely spaced from one another.

The sealing means 80 includes a retaining ring 88 having an annular internal wall portion 90 held against the inside of the housing 14 so as to project from this housing a distance corresponding approximately to the distance from this housing to the junction of the flange 82 on the cover 12 with this cover. At this upper point, the retaining ring 88 is bent over as indicated in Fig. 5 so as to include a curved annular top 92. This retaining ring 88 also includes an outer cylindrical wall 94 attached to this top 92 so as to project back parallel to the interior wall 90 within the space between the two flanges 82 to immediately adjacent the flange 82 formed upon the housing 14.

Between the outer wall 94 and these two flanges 82 there is held a sealing ring 96 which is preferably, with this modification of the invention, formed of an elastomeric material having in its uncompressed state a substantially circular cross section. As the flanges 82 are drawn together by the operation of the clenching band 32, substantially as described in connection with the construction illustrated in Fig. 2 of the drawing, this sealing ring 96 is deformed to the substantially trapezoidal shape indicated in Fig. 5 of the drawing. The amount of compression of different portions of this sealing ring, of course, varies in the construction shown so that the amount of compression adjacent the ends 86 is greater than the amount of compression immediately adjacent the interior of the housing 14. Thus, the portions of the sealing ring 96 immediately adjacent the flanges 82 are relatively free to deform so as to form a very effective seal as pressure is transmitted to them from the interior of the housing 14.

It will be readily realized that the structure shown in Fig. 5 of the drawing differs from the structure shown in Fig. 2 in several constructional details. The complete structure of the sealing means 80 shown in Fig. 5 is comparatively simple to form, when the cover 12 and the housing 14 are formed of very heavy sheet metal such as is normally used in pressure vessels of the type of oil filters.

Those skilled in the art will realize that the constructions described above are exceedingly efficient for the purpose intended, are relatively simple, foolproof, and easily manufactured. Further, these constructions are such that they are not easily damaged during use and even if part of either of the flanges 18 is bent out of shape a minor amount, or if parts of the sections 36 are bent due to malhandling, the complete sealing structures are still operative for the purpose described.

Those skilled in the art will realize that a number of minor modifications within the constructions shown may be made without departing from the essential teachings of this specification. All such modifications of this category are to be considered as part of the inventive concept insofar as they are defined by the appended claim.

We claim as our invention:

In combination: cylindrical housing and cover members having thereon opposed, annular, outwardly projecting flanges which provide an annular sealing ring cavity therebetween, said flanges including straight side wall portions which converge outwardly toward each other and including end wall portions which extend axially toward each other from the outer edges of said side wall portions, whereby said cavity is substantially trapezoidal in cross section; a sealing ring in said cavity; a clamping band of trapezoidal cross section having outwardly converging, straight side wall portions engaging said side wall portions of said flanges and including substantially the same angle as said side wall portions of said flanges so that said side wall portions of said clamping band lie flat against said side wall portions of said flanges; means for tightening said clamping band; and a retaining ring telescoped into and carried by said housing member, said retaining ring having at one end thereof an annular, reversely bent flange integral with and spaced outwardly from the body of said retaining ring and projecting outwardly into said cavity to hold said sealing ring against said side and end wall portions of said flanges on said housing and cover members.

References Cited in the file of this patent

UNITED STATES PATENTS

| | | |
|---|---|---|
| 643,787 | Brochu | Feb. 20, 1900 |
| 1,043,412 | Faunce | Nov. 5, 1912 |
| 1,376,216 | Mittinger | Apr. 26, 1921 |
| 1,826,947 | Nelson | Oct. 13, 1931 |
| 1,871,834 | Astrom | Aug. 16, 1932 |
| 2,665,663 | Rawson | Jan. 12, 1954 |
| 2,688,170 | Balzer | Sept. 7, 1954 |
| 2,709,524 | Russell et al. | May 31, 1955 |

FOREIGN PATENTS

| | | |
|---|---|---|
| 557,582 | France | May 8, 1923 |